Dec. 1, 1970     R. J. KREIN     3,544,163
ARTICULATED CONNECTOR
Filed Nov. 8, 1968     2 Sheets-Sheet 1
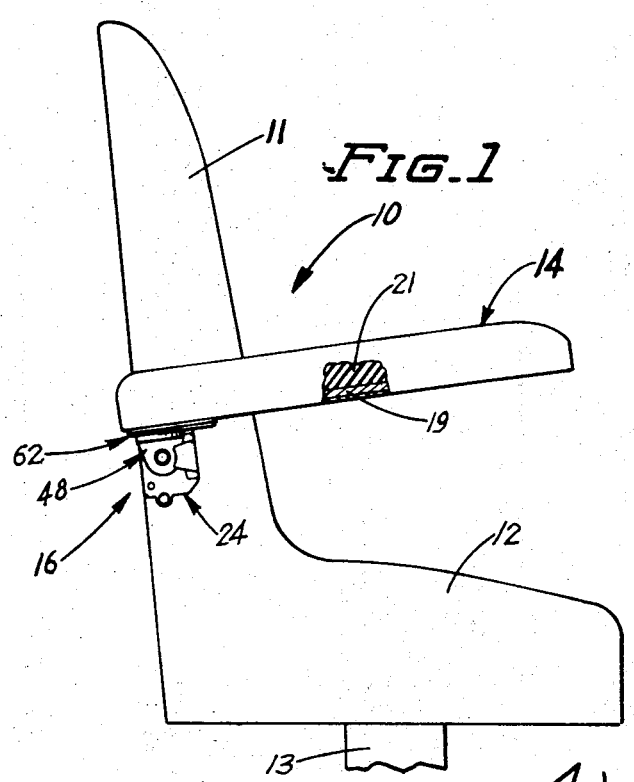
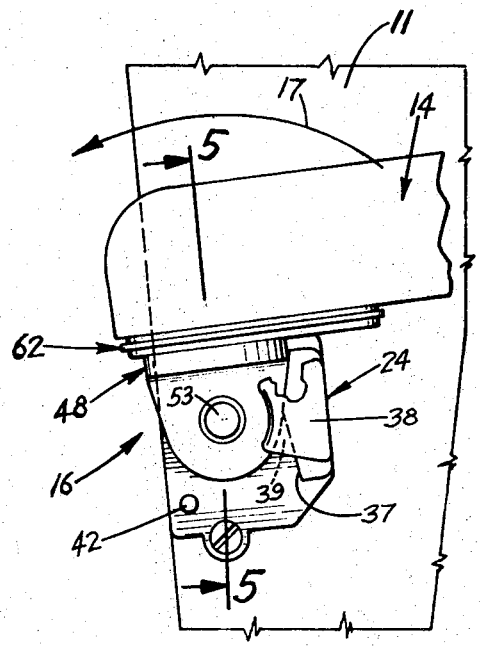
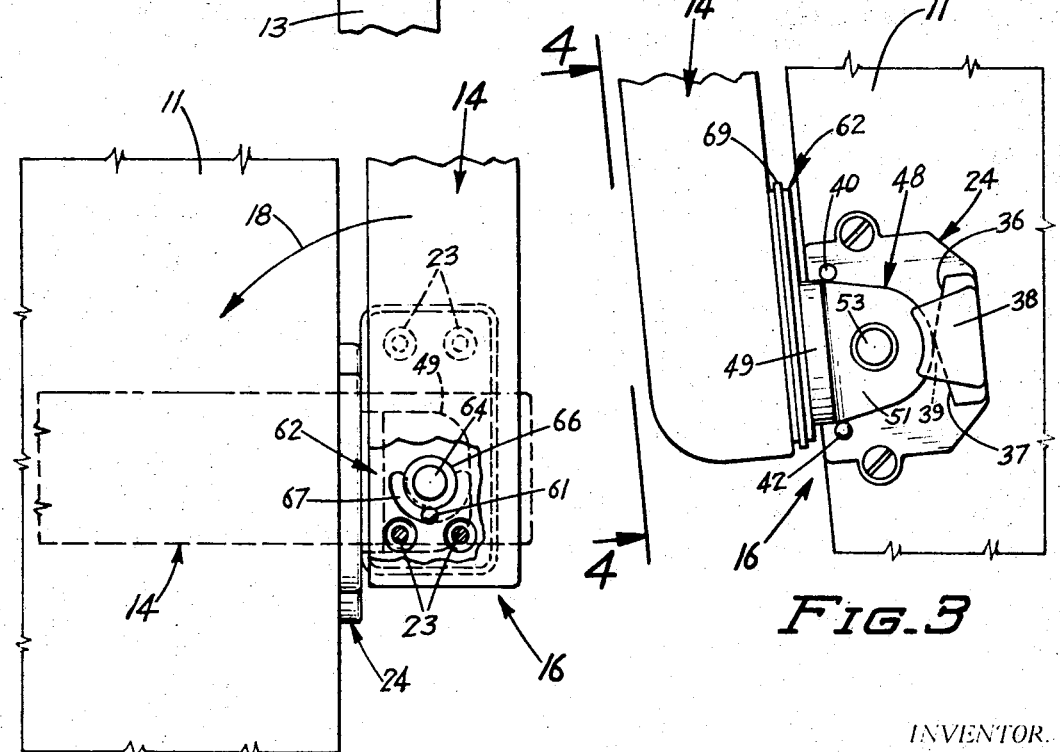
INVENTOR.
REUBEN J. KREIN
BY
ATTORNEYS Dec. 1, 1970    R. J. KREIN    3,544,163
ARTICULATED CONNECTOR
Filed Nov. 8, 1968    2 Sheets-Sheet 2

INVENTOR.
REUBEN J. KREIN
BY
Burd, Braddock & Bartz
ATTORNEYS

United States Patent Office 3,544,163
Patented Dec. 1, 1970

3,544,163
ARTICULATED CONNECTOR
Reuben J. Krein, Forest City, Iowa, assignor to Stitchcraft Corporation, Forest City, Iowa, a corporation of Iowa
Continuation-in-part of application Ser. No. 762,203, Sept. 16, 1968. This application Nov. 8, 1968, Ser. No. 774,328
Int. Cl. A47c 7/36, 7/54
U.S. Cl. 297—417
21 Claims

ABSTRACT OF THE DISCLOSURE

A seat having an arm rest attached with an articulated connector to one side of the back of the seat. The articulated connector has pivotally related members carrying stops positioned to permit the connector to be mounted on either side of the seat back to operably hold the arm rest in a first forward position and in a second storage position adjacent the back side of the seat back.

CROSS REFERENCE TO RELATED APPLICATION

This application is a continuation-in-part to U.S. patent application Ser. No. 762,203, filed Sept. 16, 1968, for Movable Arm Rest.

BACKGROUND OF INVENTION

Seats and chairs, as vehicle seats, are equipped with arm rests which move between an extended horizontal position above the seat cushion to a storage or retracted position. On some seats the arm rest is hinged to the sides of the seat back. In the storage position this arm rest swings to a substantially horizontal position adjacent the back rest. An example of this type of arm rest and connecting linkage is shown in U.S. Pat. No. 3,168,346. In co-pending U.S. patent application Ser. No. 762,203, the movable arm rest is movably attached to the seat so that it can be stored behind the seat back where it does not interfere with the use of the seat. The articulated connector of the present invention is usable to attach an arm rest on either side of the seat so that the arm rest is selectively located in a first forwardly projected position and in a second storage position behind the seat.

SUMMARY OF INVENTION

The invention relates broadly to a connector for attaching a member to a seat, chair or other supporting devices. The connector is characterized as an articulated linkage operable to attach an arm rest to a seat, to hold the arm rest in a forward position adjacent the side of the cushion of the seat and to allow the arm rest to be pivoted up and folded behind the back of the seat. The articulated linkage can be interchangeably attached to either the left or right side of the seat so that the arm rest can be used on either side of the seat.

IN THE DRAWINGS

FIG. 1 is a side elevational view of a seat equipped with an arm rest located in the forward position;

FIG. 2 is an enlarged side elevational view of the articulated connector mounting the arm rest on the side of the back of the seat;

FIG. 3 is a view similar to FIG. 2 showing the arm rest in the upright position.

FIG. 4 is a rear elevational view taken along line 4—4 of FIG. 3;

Figure 5:
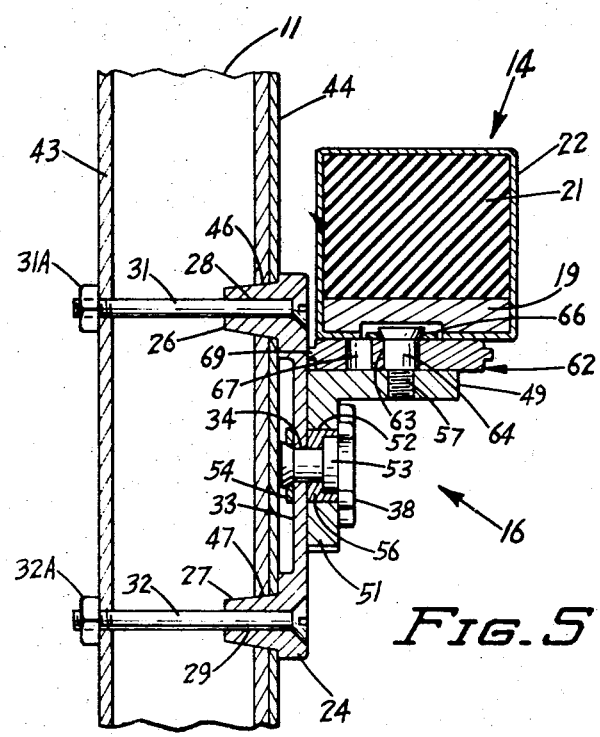
FIG. 5 is a sectional view taken along line 5—5 of FIG. 2.

Referring to the drawings, there is shown in FIG. 1, a seat or chair indicated generally at 10 having an upwardly projected back 11 and a forwardly directed bottom or cushion 12. The entire seat is mounted on an upright support 13 or similar structure used to secure the seat on a frame or other fixed member. Seat 10 can be a conventional bucket seat used in an automobile, motor home, and like vehicle or a chair used in other environments.

Movably mounted on one side of back 11 is an arm rest indicated generally at 14. An articulated connector or linkage indicated generally at 16 mounts the arm rest on the side of the seat back 11. Articulated connector 16 is the sole support for the arm rest whereby the arm rest does not engage or is supported by any of the fabric covering of the seat. As shown in FIG. 1, the articulated connector 16 has three pivotally related parts or elements and first and second stop means jointly operable to hold the arm rest 14 in a first forward poesition above and adjacent the side of the bottom 12 to provide a support or rest for the arm of a person seated in seat 10. The arm rest 14 is movable to a second storage position behind the seat back 11 as shown in the broken lines in FIG. 4. When the arm rest 14 is in the storage position it is located behind seat back in the same general or horizontal plane established by the arm rest located in the forward position. Arm rest 14 is initially pivoted in an upright direction, as indicated by arrow 17 in FIG. 2, to move the arm rest to an upright position adjacent the side of the back 11. As shown in FIG. 4, the arm rest 14 is then pivoted in a downward direction, as indicated in the direction of arrow 18, to the transverse horizontal storage position behind seat back 11. The connector 16 retains the arm rest 14 in the transverse horizontal storage position.

Referring to FIG. 5, arm rest 14 comprises an elongated support 19 carrying a body of padding or cushion material 21. Both the support and cushion 21 are enclosed in a cover 22 of flexible material, as fabric, leather, canvas and the likes. Returning to FIG. 1, the length of the arm rest 14 is slightly shorter than the horizontal extent of bottom 12. As shown in FIG. 4, four fasteners 23, as bolts or screws, are used to attach the connector 16 to the end of the support 19.

Figure 6:
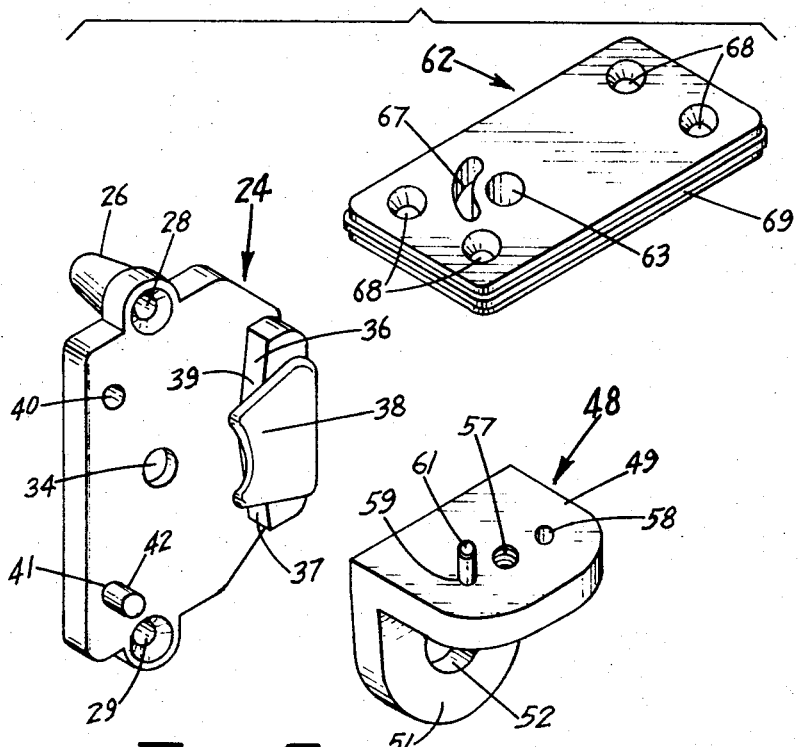
FIG. 6 is an exploded perspective view of the articulated connector for mounting the arm rest to the seat.

Returning to FIGS. 5 and 6, articulated connector 16 comprises three pivotally related members, including a first member or base plate indicated generally at 24 having a laterally directed pilot bosses 26 and 27 in the upper and lower portions of the plate. The plate 24 as well as the bosses 26 and 27 have holes with counter sunk head sections 28 and 29 for accommodating fasteners 31 and 32, as bolts, operable to mount the plate 24 on the side of the back rest 11. Plate 24 has a back recess 33 and a central hole 34 open to the recess 33.

As shown in FIG. 3, plate 24 has stops 36 and 37 located laterally and forwardly from the mid-portion of plate. Stops 36 and 37 have rearwardly facing stop surfaces which slope forwardly from a horizontal plate which passes through hole 34. The outside of the stops 36 and 37 has a flange 38 extended in the rearward direction toward the hole 34 to form a channel 39 with the adjacent side of plate 24. Plate 24 has a pair of spaced holes 40 and 41 opposite the stops 36 and 37. A stop pin 42 located in hole 41 with a press fit limits the pivotal movement of the arm rest 41 in the upright direction to approximately 90°. Hole 40 accommodates a similar pin when the articulated connector is used to mount an arm on the opposite side of the seat.

As shown in FIG. 5, back rest 11 has a tubular frame 43 carrying seat covering 44. The frame 43 has a pair of spaced holes 46 and 47 for accommodating the bosses 26 and 27 to eliminate shearing forces on the fasteners 31 and 32. The fasteners 31 and 32 extended through the holes in the bosses are threaded into nuts 31A and 32A mounted on the inside of frame 43. Plate 24 and fasteners 31 and 32 attach the articulated connector 16 directly on the frame of the seat without utilizing the seat fabric or covering as a support for the connector or arm rest.

Pivotally mounted on the base plate 24 is an intermediate member indicated generally at 48 comprising a right angle element having a top flange 49 and a side flange 51. Side flange 51 has a central hole 52 for accommodating a rivet or similar fastener 53 used to pivotally connect the intermediate member 48 to the plate 24. As shown in FIG. 5, rivet 53 has a counter sunk head and a body extended through the hole 34 in the plate 24. The inner end of the rivet is flattened about a washer 54. The head of the rivet is located in a counter sunk adaptor 56 so that the outside surface of the flange 51 is flat. As shown in FIG. 3, a peripheral portion of flange 51 is located in the groove 39 to hold the flange 51 in close relationship with the plate 24 and reduce the twisting forces on the rivet 53 so as to prevent lateral movement of the arm rest 14.

Flange 49 has a central hole 57 and bores 58 and 59 located on opposite sides of the hole 57 in longitudinal alignment with the flange 51. A pin 61 inserted in hole 59 projects in an upward direction to form a stop. The hole 58 is used to accommodate the same or a similar pin when the articulated connector is used to mount an arm rest on the opposite side of the back.

Positioned on top of flange 49 is a top or third plate member 62 indicated generally at 62 having a hole 63 for accommodating a fastener 64, as a screw or rivet. Fastener 64 is threaded into hole 50 to pivotally mount the member 62 on the flange 49. A washer 66 located over the head of the fastener 64 partly covers an arcuate slot 67 to hold pin 61 and hole 59. Slot 67 has an approximate circumferential length of 90° or one-quarter of a circle and is concentric with hole 63. As shown in FIG. 4, the slot 67 receives the stop pin 61 to limit the pivotal movement of the third member 62 to approximately one-quarter of a circle. The corner portions of the member 62 have holes 68 for fasteners 23 which are counter sunk from both sides so that the plate 62 can be reversed and used to support an arm rest on the opposite side of the back. The fasteners 23 project through the holes 68 to attach the arm rest to the third member 62.

Located around the periphery of the third member 62 is an outwardly directed rib 69 which increases the effective width of the member 62. As shown in FIG. 5, when the arm rest 14 is in the forward position, rib 69 is in surface engagement with the adjacent face of the plate 24 preventing pivotal movement of the member 62.

In use, the articulated connector 16 has three pivotally related parts or elements which collectively coact with each other to hold the arm rest 14 in the first forward position adjacent the side of a person sitting in the seat 10 or in the second storage position adjacent the seat back 11. The plate 24 is mounted directly on the frame of the seat so that the arm is not supported nor engages any portion of the seat covering or fabric. When the arm rest 14 is in the forward position, as shown in FIGS. 1, 2 and 5, the forward edge of the intermediate member 48 engages the stop 36 limiting the forward pivotal movement of the intermediate member. A portion of the outside surface of the flange 51 located in groove 39 is held in flat engagement with the plate 24 by the fastener 53 and flange 38. Fastener 53 pivotally mounts the intermediate member 48 on the plate 24. The top member 62 pivotally mounted on the top flange 49 of the intermediate member 48 moves about an axis which is generally normal to the axis of the fastener 53. The top member 62 is held in a forward position by the coaction between its rib 69 and the adjacent wall of the plate 24. The rib 59 is in close sliding engagement with the plate 24 and thereby prevents rotation of the member 62 about the fastener 64. A substantial length of the rib 69, preferably more than one-half, engages the plate 24 so that the third member 62 is stabilized in both directions of movement. The arm rest 14 cannot be moved inwardly or outwardly relative to the person in the seat 10.

Arm rest 14 is moved to its storage position behind back 11 by raising the arm rest 14 in the direction of arrow 17, as shown in FIG. 2, to an upright position. As shown in FIG. 3, when the arm rest 14 is in the upright position the flange 51 engages stop pin 42 thereby limiting the rotation of the intermediate member 48 and fastener 53. The arm rest 14 is then moved behind the back 11 in the direction of the arrow 18 pivoting the arm without the fastener 64. The arcuate slot 67 coacts with the stop pin 61 to limit the pivotal movement of the arm to about 90° in a horizontal position adjacent the back side of the back 11 as shown in broken lines as shown in FIG. 4.

The articulated connector 16 is usable to pivotally mount an arm rest adjacent opposite sides of the back 11. The connector is invertable to a left side unit by merely turning over the top plate 62 and placing the pin 61 in the hold 58. Stop pin 42 is removed from the hole 41 and inserting it into the hole 40. The same parts of the articulated connector can be used for either a right-hand or left-hand articulated connector capable of mounting an arm rest on either side of the seat 10.

Figure 7:
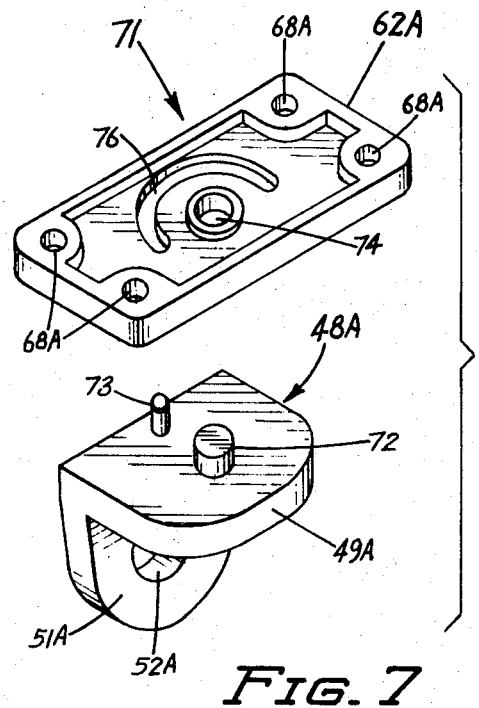
FIG. 7 is an exploded perspective view of the second and third members of a modified articulated connector.

Referring to FIG. 7, there is shown a modified articulated connector indicated generally at 71 for mounting an arm rest to the frame of a seat. Connector 71 has a base plate 24, an intermediate member 48A and a top member 62A. Plate 24 is identical with member plate 24 shown in FIGS. 5 and 6. Identical parts of intermediate member 48A and top member 62A have the same reference numbers with a suffix A. Hole 52A in flange 51A is used to accommodate a fastener to pivotally connect the intermediate member 48A to the plate 24 with a portion of the flange 51A located in the groove 39. The top flange 49A has an upwardly projected boss 72 and an upright stop pin 73 located in the mid-portion of the base of the flange 49A.

The top member 62A has a centrally located hole 74 spaced from an inwardly located semi-circular or about 180° slot 76. The slot 76 is concentric with the hole 74 and has ends which are in general longitudinal alignment with the center of the hole 74.

When the third member 62A is in assembled relation with the intermediate members 42A boss 72 projects through the hole and is turned over to positively and pivotally connect the third member 62A to the flange 49A. Stop pin 73A is located in the semi-circular slot 76. When the arm rest is in a forward position the pin 73 is located in the mid-section of the slot 76 with the side of the top member 62A in surface engagement with the side of the plate 24 to prevent pivotal movement of the plate about the boss 72A. When the arm is moved to the upright position the plate moves away from the plate 24 so that the arm rest can be pivoted about the boss 72 to a storage position adjacent the back side of the back 11.

The connector 71 is usable on either side of the back 11 without modification or changing positions of parts because the top member 62A can be pivoted in either direction from the upright position. This can be accomplished without any interchanging of the parts or removing the stops except the stop pin 42 in the plate 24.

The articulated connectors 16 and 71 function to solely support arm rests on the seat frames on either side of the seat. The connectors are in either a right-hand connector directly attached to the frames so that the arm rests do not bear nor stop on the fabric or covering of the seats. All of the weight or forces on the arm rests are transferred to the frames of the seat through the base plates 24.

The embodiments of this invention in which an exclusive property or privilege is claimed are defined as follows:

1. An articulated connector for mounting a member to a frame comprising: a first means securable to the frame, and a second means pivotally mounted on the first means to selectively hold the member in a first position and in a second position, said second means comprising a first element having a first side and a second side generally normal to the first side, first pivot means connecting the first side of the first element to the first means, first coacting stops on the first means and first element to limit pivotal movement of the first element relative to the first means, a second element secured to the member, second pivot means connecting the second side of the first element to the second element for pivotal movement of the second element relative to the first element about an axis generally normal to the axis of the first pivot means, and second coacting stop means on the first element and second element to limit pivotal movement of the second element relative to the first element.

2. The connector of claim 1 wherein the first means is a plate securable to the frame.

3. The connector of claim 1 wherein the first coacting stop means includes a first stop shoulder on the first means engageable with a portion of the first element to limit movement of the first element in one direction and a second stop spaced from the stop shoulder and engageable with a separate portion of the first element to limit the movement of the first element in the opposite direction.

4. The connector of claim 1 wherein the second coacting stop means comprises a stop pin secured to one of the elements and extended into an arcuate slot in the other element.

5. The connector of claim 1 wherein the first means has a groove accommodating a portion of the second means.

6. The connector of claim 1 wherein the first means is a plate having bosses for mounting the plate on the frame.

7. The connector of claim 1 wherein the first element of the second means comprises a right angle member, said first pivot means pivotally mounting a first portion of the right angle member to the first means for movement about a first axis, said second element pivotally mounted on a second portion of the right angle member for movement about a second axis extended generally normal to the first axis.

8. The connector of claim 1 wherein an arm rest is secured to the second means whereby the arm rest is selectively held in a forward position and in a second storage position normal to and in the same general plane established by the arm rest in the forward position.

9. An articulated connector for mounting a member to a frame comprising: a first means securable to the frame, and a second means pivotally mounted on the first means to selectively hold the member in a first position and in a second position, said first means comprising a side plate attachable directly to the frame, and said second means comprising a right angle element, first pivot means connecting the right angle element to one side of the side plate, first stop means on the side plate for limiting pivotal movement of the right angle element relative to the plate, a top plate securable to the member, second pivot means connecting the right angle element to the top plate for pivotal movement about an axis generally normal to the axis of the first pivot means, and second stop means on the right angle element and top plate to limit movement of the top plate relative to the right angle element.

10. The connector of claim 9 wherein the side plate has a flange adjacent the first stop means to retain a portion of the right angle element close to the side plate.

11. The connector of claim 10 wherein the second stop means comprise an arcuate slot in the top plate and a pin located in the slot and secured to the right angle element.

12. The connector of claim 12 wherein the arcuate slot extends approximately 180°.

13. The connector of claim 10 wherein the top plate is reversible whereby the connector can mount an arm rest on either side of the seat.

14. The connector of claim 10 wherein the top plate has a side rib engageable with the plate of the first means when the right angle element is in engagement with the first stop means.

15. The connector of claim 9 wherein the second stop means comprise an arcuate slot in the top plate generally concentric with the pivot means and a stop member located in the slot and attached to the right angle element, said slot extended at least 90 degrees.

16. The connector of claim 9 including a third stop means on the side plate for limiting pivotal movement of the right angle element, said right angle element being movable between the first stop means and the third stop means.

17. The connector of claim 9 wherein said side plate has outwardly directed boss means for mounting the side plate on the frame.

18. The connector of claim 9 wherein said side plate has a flange extended over a portion of the right angle element to retain the right angle element in a close relationship to the side plate.

19. The connector of claim 3 wherein the second stop can be mounted in selected positions on the first means to change the pivotal angle of movement of the first element.

20. The connector of claim 3 including a flange on the shoulder extended over a portion of the first element to retain the first element in a close relationship adjacent the first means.

21. The connector of claim 1 wherein the first coacting stop means includes a first stop shoulder and a second stop shoulder on the first means selectively engageable with the first element, and a third stop mountable in selected positions on the first means spaced from the first stop shoulder and second stop shoulder to change the pivotal angle of movement of the first element.

References Cited

UNITED STATES PATENTS

| | | | |
|---|---|---|---|
| 361,528 | 4/1887 | Kazanjian | 297—408 X |
| 3,366,430 | 1/1968 | Diedrich | 312—201 |
| 3,368,842 | 2/1968 | Polsky | 297—417 X |

CASMIR A. NUNBERG, Primary Examiner

U.S. Cl. X.R.
297—403, 408, 414

PO-1050
(5/69)

UNITED STATES PATENT OFFICE
CERTIFICATE OF CORRECTION

Patent No. 3,544,163      Dated December 1, 1970

Inventor(s) Reuben J. Krein

It is certified that error appears in the above-identified patent and that said Letters Patent are hereby corrected as shown below:

Column 1, line 41, "on" should be --to--.

Column 2, line 18, "poesition" should be --position--.

Column 2, line 39, "likes" should be --like--.

Column 6, line 7, "claim 10" should be --claim 9--.

Column 6, line 11, "claim 12" should be --claim 11--.

Column 6, line 13, "claim 10" should be --claim 9--.

Column 6, line 16, "claim 10" should be --claim 9--.

SIGNED AND SEALED
MAR 9 1971

(SEAL)
Attest:

Edward M. Fletcher, Jr.
Attesting Officer

WILLIAM E. SCHUYLER, JR.
Commissioner of Patents